(12) United States Patent  (10) Patent No.: US 7,560,148 B2
Peterson et al.  (45) Date of Patent: Jul. 14, 2009

(54) LENS ASSEMBLY APPARATUS AND METHOD

(75) Inventors: Wade A. Peterson, Fresno, CA (US); Douglas P. Lewis, Oakhurst, CA (US)

(73) Assignee: B-K Lighting, Inc., Madera, CA (US)

( * ) Notice: Subject to any disclaimer, the term of this patent is extended or adjusted under 35 U.S.C. 154(b) by 482 days.

(21) Appl. No.: 11/400,451

(22) Filed: Apr. 6, 2006 (Under 37 CFR 1.47)

(65) Prior Publication Data

US 2008/0062695 A1  Mar. 13, 2008

Related U.S. Application Data

(60) Provisional application No. 60/669,788, filed on Apr. 8, 2005.

(51) Int. Cl.
*G02B 1/06* (2006.01)

(52) U.S. Cl. ........................... 428/34; 42/34.1; 42/36.92

(58) Field of Classification Search ................. 362/318, 362/293, 294; 359/432, 509; 428/34, 34.1, 428/36.92
See application file for complete search history.

(56) References Cited

U.S. PATENT DOCUMENTS

| 4,044,519 A | 8/1977 | Morin et al. |
| 4,725,755 A | 2/1988 | Hasegawa |
| 4,780,640 A | 10/1988 | Hasegawa |
| 4,838,665 A | 6/1989 | Hasegawa et al. |
| 5,367,444 A | 11/1994 | Bornhorst et al. |
| 5,625,496 A | 4/1997 | Akiyama et al. |
| 5,774,273 A | 6/1998 | Bornhorst |

*Primary Examiner*—Anabel M Ton
(74) *Attorney, Agent, or Firm*—Koppel, Patrick, Heybl & Dawson

(57) ABSTRACT

A thermal barrier apparatus includes a lens cell with a vacuum chamber, the lens cell having opposing lenses, and a one-way gas valve coupled to the lens cell to allow venting of the vacuum chamber in response to thermal expansion of gas in the vacuum chamber.

28 Claims, 3 Drawing Sheets

FIG. 1
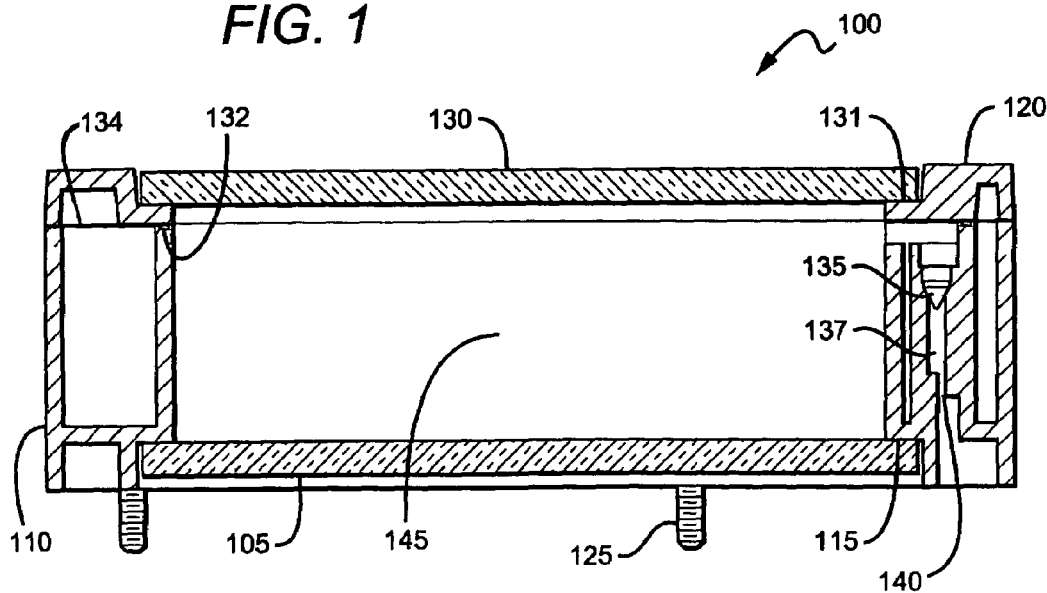
FIG. 2A
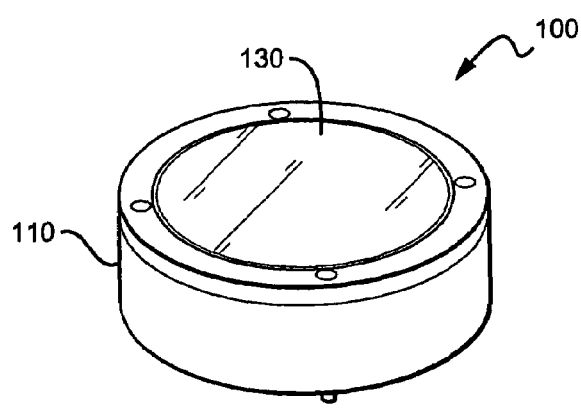
FIG. 2B

LENS ASSEMBLY APPARATUS AND METHOD

This application claims benefit of Provisional Application Ser. No. 60/669,788, filed Apr. 8, 2005.

BACKGROUND OF THE INVENTION

1. Field of the Invention

This invention relates to optic, and more particularly to lens assemblies.

2. Description of the Related Art

Exterior lighting systems typically employ in-ground or aboveground lighting fixtures to illuminate a walkway, building or other decorative features. In many applications, the exterior lens of such fixtures is in an area where its surface may come into contact with pedestrians, children and heat-sensitive objects. Whether such fixtures are in-ground or above ground, they must be designed with care to avoid injury or damage that may be caused by unacceptably high surface temperatures their exterior lens.

One typical solution to protect heat-sensitive objects from the light source is to include a protective lens assembly. The assembly typically establishes a predetermined distance between the light source and exterior lens to reduce thermal transfer between them. Thicker lenses and heat sinks may also be used to further reduce such thermal transfer. Or, additional lenses may be added between the light source and external lens. Unfortunately, as these partially enclosed assemblies cool after use, cool air is drawn into the assemblies resulting in corrosion-producing water vapor condensation.

A need still exists, however, to further reduce heat transfer between the light source and exterior lens without inadvertently creating internal vapor condensation.

SUMMARY OF THE INVENTION

A thermal barrier apparatus is disclosed for use in optical systems. It has a lens cell with a vacuum chamber, the lens cell having opposing lenses, and a one-way gas valve coupled to the lens cell to allow venting of the vacuum chamber in response to thermal expansion of gas in the vacuum chamber, so that a convective, conductive and radiant thermal barrier is established between opposing sides of the lens cell.

A method of lens cell operation is also disclosed. By heating gas in an insulating chamber through a first lens of the insulating chamber, evacuating a portion of the gas through a one-way valve with thermal expansion, and cooling a remaining portion of the gas, a partial vacuum is created within the insulating chamber to inhibit condensation of water vapor in the insulating chamber and to inhibit thermal transfer between the first lens and a second lens that is in complementary opposition to the first lens.

BRIEF DESCRIPTION OF THE DRAWINGS

The components in the figures are not necessarily to scale, emphasis instead being placed upon illustrating the principals of the invention. Like reference numerals designate corresponding parts throughout the different views.

FIG. 1 is a cross-sectional view of a lens assembly according to one embodiment of the invention;

FIGS. 2A and 2B are perspective cross-sectional and perspective views, respectively, of the lens assembly illustrated in FIG. 1;

DETAILED DESCRIPTION OF THE INVENTION

Figure 3A:
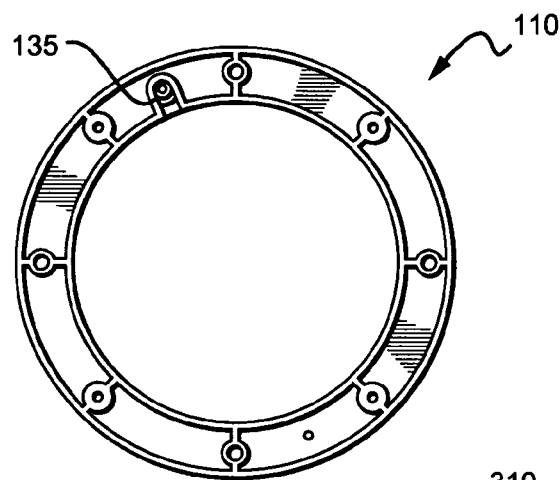
FIGS. 3A and 3B are plan and perspective views, respectively, of one embodiment of an insulating body for use with the lens assembly illustrated in FIGS. 1, 2A and 2B.

A lens cell is disclosed that may be used with a lighting fixture, such as an in-ground lighting fixture, to reduce hot spots at the surface of the fixture's external lens. It has two lenses connected by an insulating body, with the lenses and insulating body establishing an insulating chamber between them. A one-way valve allows thermally expanding air to vent from the insulating chamber to an exterior of the lens apparatus while restricting the reintroduction of air into the insulating chamber as the lens assembly cools. A convective, conductive and radiant thermal barrier is thereby established to reduce heat transfer between the light source and exterior lens without inadvertently creating internal vapor condensation.

Although embodiments of the invention are applicable to optic systems in general, several embodiments are particularly applicable to lens assemblies for use in in-grade lighting fixtures and will be discussed within that context in greater detail, below. It is understood, however, that the embodiments are equally applicable to other optical systems removed from in-grade lighting fixtures.

FIG. 1 illustrates one embodiment of a lens cell having multiple components, alternately called a lens assembly 100. A lower lens 105 is coupled to a spacer, preferably an insulating body 110, at a lower seat 115. The coupling is preferably accomplish with a liquid gasket such as silicon that acts as both glue joint and gas seal between the insulating body 110 and lower lens 105. An upper faceplate 120 is coupled to the insulating body 110, preferably with mounting hardware 125 that are a plurality of screws. An upper lens 130 is coupled to the upper faceplate at an upper seat 131 using a liquid gasket, preferably silicon as used for the lower seat 115, to establish both a glue joint and gas seal. A seal groove 132 is formed in an upper diameter of the insulating body 110 to accept an optional seal groove gasket (not shown). A seal, preferably a gasket 134, is placed on the insulating body 110 during assembly of the lens assembly, and is preferably a cut silicon gasket such as part number HT-805 (S) offered by Columbus Gasket of Columbus, Ohio, to establish a gas barrier between the insulating body 110 and the upper faceplate 120. Or, the gasket may be another closed-cell silicon foam and either pre-formed, cut or molded to accomplish the desired size. The gasket may also be formed of liquid silicon, an adhesive or other material to accomplish the gas barrier between the insulating body 110 and the upper faceplate 120. In an alternative embodiment, the upper faceplate 120 may be omitted and an upper seat provided directly by the insulating body 110, with the upper seat alone or in combination with another seal providing a gas seal.

A one-way valve 135 is disposed within a valve cavity 137 formed in the insulating body 110. An exterior vent port 140 communicates with an insulating chamber 145, established by the upper and lower lenses 130, 105 and the insulating body 110, through the one-way valve 135. The one-way valve 135 may be a check valve, spring-bearing valve, flapper valve, duck-billed valve or other valve that enables gas to escape the insulating chamber 145 when the gas pressure in the chamber is greater than atmospheric pressure outside of the lens assembly 100. Preferably, the one-way valve 135 is a valve as shown and described in FIG. 2 of U.S. Pat. No. 6,254,258 issued to Patrick Case and such valve is incorporated by reference herein. Or, the check valve can be Part No. ACH-009-03 manufactured by A. C. Hoffman. The one-way valve 135 and seal 134 and gasket of the lower seat 115 provide a gas barrier for the insulating chamber 145 to reduce, or preferably prohibit, the further introduction of atmospheric air into the insulating chamber 145 after assembly. Although in this embodiment of the invention the insulating chamber 145 is described as established by the upper and lower lenses 130, 105 and the insulating body 110, the cavity between these components may alternatively be described as a vacuum chamber to highlight the importance of the cavity itself, rather than the components around it which establish such a vacuum chamber.

Initially, the insulating chamber 145 is formed in ambient conditions and contains air. Preferably, a vacuum pump is positioned in complementary opposition to the exterior vent port 140 and a partial vacuum, preferably 21 inches of mercury, is pulled in the insulating chamber 145 to reduce subsequent thermal transfer between the lower and upper lenses 105, 130. Or, gas in the insulating chamber 145 may be argon or other inert gas or gas combination to reduce the thermal transfer between the lenses 105, 130 from what would otherwise exist with atmospheric air at ambient conditions.

The upper and lower lenses are preferably transparent and preferably each formed from borosilicate glass that is 3/8 inches thick. Or, crystal material or other transparent material suitable for this embodiment may be used. Preferably, the lenses are flat and provide no optical power, but can be convex or concave as desired to focus light through the lenses. In an alternative embodiment, the lenses may be formed from colored glass or provided with colored film to establish a color filter. Increasing the lens' thickness. would reduce the thermal conductivity between upper and lower surfaces. of such lenses. Similarly, reducing lens thickness would increase their thermal conductivity.

The insulating body 110 of the lens assembly 100 is preferably composed of an insulating material, such as plastic, fiberglass or other non-metallic fiber composite. The material resists the conductive heat created by the light source (typically a lamp) and other lighting-fixture components from reaching the exposed surfaces of the lens assembly 100. The insulating body 110 is preferably formed with relatively thin vertical (vertical defined in the lower lens to top lens direction) walls to further inhibit the transfer of heat to the upper lens 130 and upper faceplate 120. An insulative barrier of gas in the insulating chamber 145, preferably partially evacuated atmospheric air, further insulates the upper and lower lenses 130, 105. The one-way valve 135 is used to allow expanding gas in the insulating chamber 145 of the lens assembly to escape when heated. This either creates or maintains (depending on the initial vacuum state) a relative vacuum in the insulating chamber 145 when the lens assembly is cooled (preferably a passive cooling) to establish a periodically renewing relative vacuum as the lens assembly 100 is periodically used. The relative vacuum creates an environment within the insulating chamber 145 that will further resist the transfer of heat from the lower to upper lenses 105, 130 through convection. As more heat is introduced to the gas of the insulating chamber 145, such as with higher wattage lamps used in an accompanying lighting fixture, a greater vacuum is created in the insulating chamber 145 upon cooling. The relative vacuum enabled with the one-way valve 135 also reduces the level of moisture in the insulating chamber 145 subsequent to cooling and reduces condensation on the lenses from what would otherwise exist without the relative vacuum in the insulating chamber 145.

If greater thermal insulation is desired between the exterior surfaces of the upper and lower lenses 130, 140, the insulating body 110 may be designed to provide greater distance between the upper and lower lenses 130, 140. Similarly, to reduce the thermal insulation between surfaces of the upper and lower lenses, the insulating body 110 can be designed to provide less separation between them.

The insulating body 110, although preferably formed of plastic, may be cast, spun or machined from other thermal insulating material. In a non-preferred embodiment, the insulating body 100 may be formed from a combination or collection of insulating and non-insulating material, or may be entirely heat conductive. The upper faceplate 120 is preferably formed of metal such as aluminum, steel, or composite material that resists normal wear and tear associated with foot traffic and in-grade lighting fixtures. Or, the upper faceplate 120 may be made of plastic or other suitable material.

FIG. 2A and 2B are perspective cross-section and cross-section views, respectively, of one embodiment of the lens assembly 100 that has circular upper and lower lenses 130, 105. Although circular lenses are illustrated, the lenses may form other shapes such as ovals, squares, rectangles, or other geometric shapes. Similarly, the shape of the insulating body 110 would preferably conform to the shape of the lenses to reduce in-ground installation difficulties and to reduce materials cost.

Figure 3B:
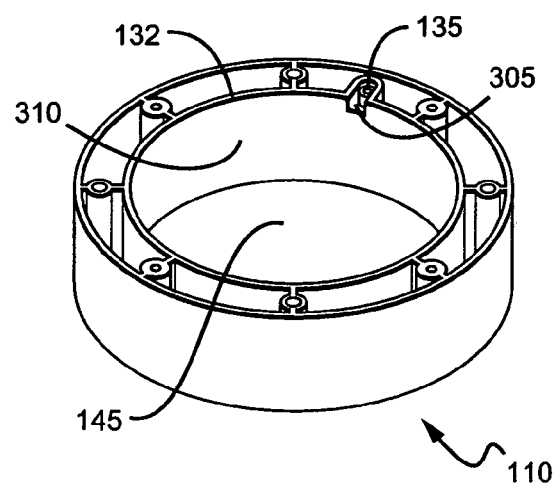

FIGS. 3A and 3B are plan and perspective views, respectively, of the insulating body 110. The one-way valve 135 communicates with the insulating chamber 145 through an interior vent port 305, with one embodiment of the vent port illustrated as a slot in an interior surface 310 of the insulating body 110. If the interior vent port 305 is a slot as illustrated, the seal grove 132 would preferably extend around a perimeter of the cavity containing the one-way valve 135 to maintain the gas barrier with the upper faceplate 120 (not shown). In one implementation of the circular insulating body 110 embodiment illustrated in FIGS. 3A and 3B, the interior diameter of the insulating chamber 145 is preferably 8.1 inches and the exterior diameter of the insulating body 110 is preferably 11 inches, with a preferred height of the insulating body measuring 3 inches.

Figure 4A:
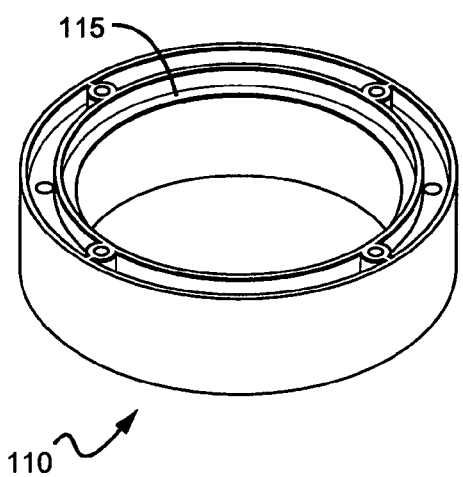
FIGS. 4A and 4B are bottom perspective and bottom plan views, respectively, of the insulating body illustrated in FIGS. 3A and 3B.
Figure 4B:
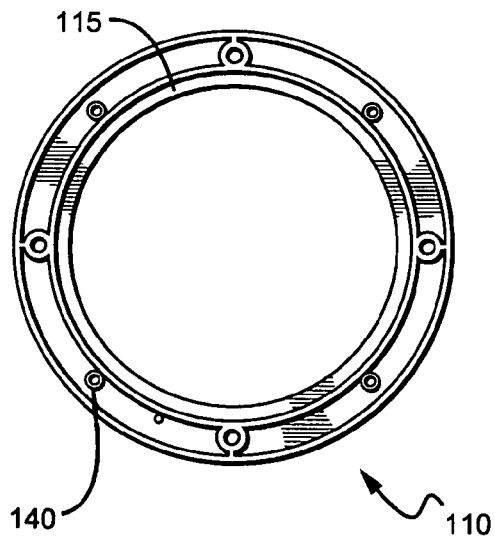

FIGS. 4A and 4B are bottom perspective and plan views, respectively, of the insulating body 110. The lower seat 115 is illustrated, with the exterior vent port 140 illustrated in FIG. 4B.

Figure 5:
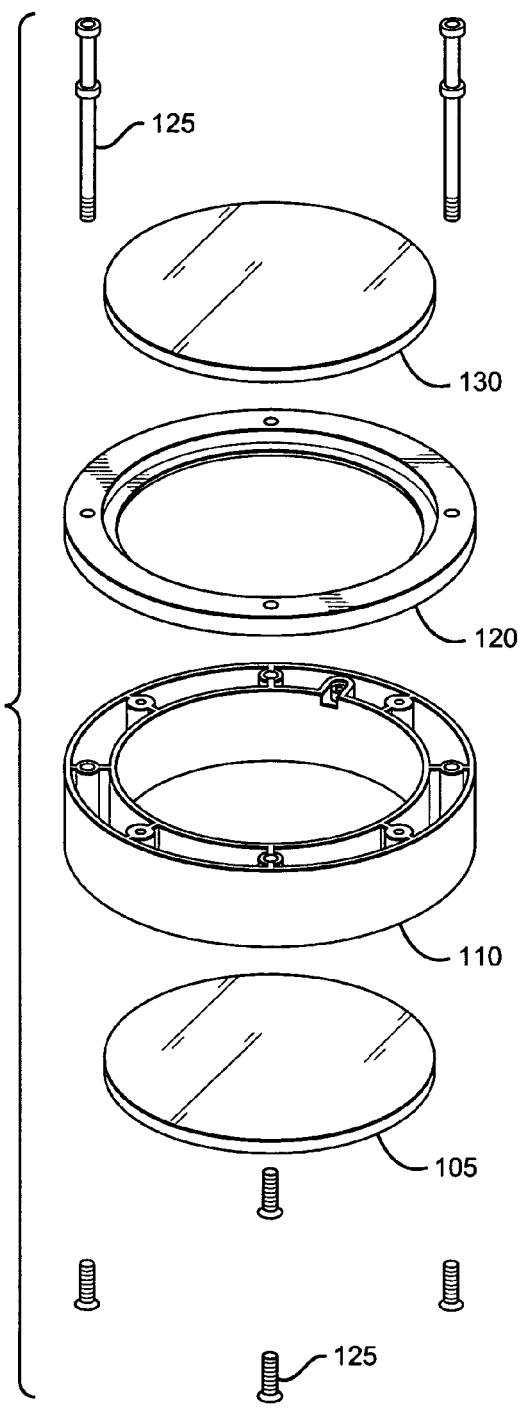
FIG. 5 is an exploded perspective view of the assembly illustrated in FIGS. 1, 2A, and 2B.

FIG. 5 is an exploded perspective view illustrating assembly of the upper and lower lenses 130, 105, upper faceplate 120 and insulating body 110 utilizing mounting hardware 125 such as threaded bolts to be received by the insulating body 110.

Figure 6:
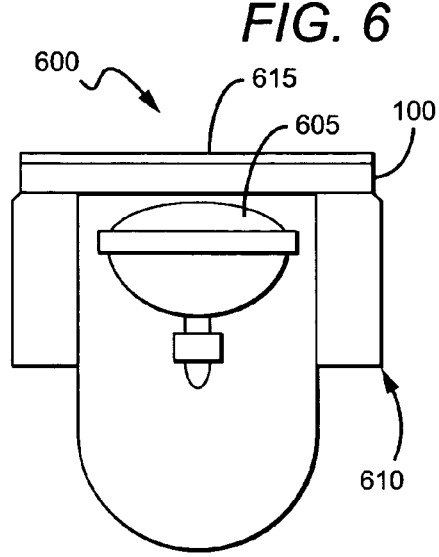
FIG. 6 is a block diagram of one embodiment of a lighting fixture that uses the lens assembly illustrated in FIG. 1.

FIG. 6 illustrates a light fixture, in the illustrated embodiment an in-ground type of light fixture, that includes the lens assembly illustrated in FIG. 1. The light fixture 600 includes the lens assembly 100 coupled to a fixture housing 610 to prevent moisture from entering the fixture housing 610. The lens assembly 100 is in complementary opposition to a lighting element, such as a lamp 605, to allow light from the lamp to pass through the lens assembly 100 to illuminate a walkway, building or other decorative feature while also providing a thermal barrier from the lamp for pedestrians, children and heat-sensitive objects.

While various implementations and embodiments of the application have been described, it will be apparent to those of ordinary skill in the art that many more embodiments and implementations are possible that are within the scope of this invention.

We claim:

1. A lens apparatus, comprising:
   first and second lenses;
   an insulating body to provide thermal insulation between said first and second lenses, said insulating body and first and second lenses, establishing an insulating chamber between them; and
   a one-way valve to communicate gas from said insulating chamber to an exterior of the lens apparatus;
   wherein a convective, conductive and radiant thermal barrier is established between said first and second lenses.

2. The lens apparatus of claim 1, wherein said one-way valve comprises a check valve.

3. The lens apparatus of claim 1, wherein said one-way valve comprises a spring-bearing valve.

4. The lens apparatus of claim 1, wherein said one-way valve comprises a flapper valve.

5. The lens apparatus of claim 1, wherein said one-way valve comprises a duck-billed valve.

6. The lens apparatus of claim 1, wherein said first lens further comprises:
   a flat outer surface and a flat inner surface.

7. The lens apparatus of claim 6, wherein said first lens is a color filter.

8. The lens apparatus of claim 1, wherein said insulating body further comprises an interior vent port to enable communication of gas between said insulating chamber and said one-way valve.

9. The lens apparatus of claim 1, further comprising:
   an upper faceplate coupled between said first lens and said insulating body.

10. The lens apparatus of claim 9, further comprising:
    a seal to establish a gas barrier between said upper faceplate and said insulating body.

11. The lens apparatus of claim 10, wherein said seal comprises a gasket.

12. The lens apparatus of claim 11, wherein said gasket comprises a cut gasket.

13. The lens apparatus of claim 10, wherein said seal comprises an adhesive.

14. The lens apparatus of claim 1, further comprising a gas at a partial vacuum in said insulating chamber.

15. The lens apparatus of claim 14, wherein said gas is at a partial vacuum of greater than 20 inches mercury.

16. A light fixture, comprising:
    a light source; and
    a lens assembly having a light source side and external surface side, said lens assembly positioned to transmit light from said light source and to provide a thermal barrier between said light source and said light fixture external side, comprising:
    first and second lenses positioned in complementary opposition to one another; and
    a periodically-renewing vacuum chamber between said first and second lenses;
    wherein said external surface side experiences reduced thermal exposure from said light source.

17. The light fixture of claim 16, further comprising a one-way valve to vent gas from said periodically-renewing vacuum chamber to the atmosphere.

18. The light fixture of claim 17, wherein said one-way valve comprises a check valve.

19. The light fixture of claim 16, wherein said first and second lenses each comprise first and second flat surfaces.

20. The light fixture of claim 19, further comprising an insulating body to connect said first and second lenses.

21. A method of lens cell operation, comprising:
    heating gas in a vacuum chamber through a first lens of said vacuum chamber, said vacuum chamber having a second lens in complementary opposition to said first lens;
    evacuating a portion of said gas through a one-way valve with thermal expansion; and
    cooling a remaining portion of said gas;
    wherein a partial vacuum is created within said vacuum chamber to inhibit condensation of water vapor in said insulating vacuum chamber and to inhibit thermal transfer between said first lens and a second lens that is in complementary opposition to said first lens.

22. The method of claim 21, wherein said cooling comprises passive cooling.

23. The method of claim 21, further comprising creating a vacuum in said vacuum chamber using thermal contraction as said heated air cools.

24. A thermal barrier apparatus, comprising:
    a lens cell with a vacuum chamber, said lens cell having opposing lenses;
    a one-way gas valve coupled to said lens cell to allow venting of said vacuum chamber in response to thermal expansion of gas in said vacuum chamber.

25. The apparatus of claim 24, wherein said opposing lenses further comprise:
    first and second parallel plates to form said lens cell.

26. The apparatus of claim 25, wherein said vacuum chamber further comprises:
    an insulating body to provide thermal insulation between said first and second plates.

27. The apparatus of claim 25, wherein said first and second plates are transparent.

28. A method of lens cell manufacture, comprising:
    establishing a vacuum chamber between first and second opposing lenses
    evacuating gas from said vacuum chamber to establish a partial vacuum; and
    inhibiting the return of gas into said vacuum chamber;
    wherein a partial vacuum is created within said vacuum chamber to inhibit condensation of water vapor in said vacuum chamber and to inhibit thermal transfer between said first and second lenses.

* * * * *